(12) United States Patent
Friend et al.

(10) Patent No.: US 10,540,263 B1
(45) Date of Patent: Jan. 21, 2020

(54) TESTING AND RATING INDIVIDUAL RANKING VARIABLES USED IN SEARCH ENGINE ALGORITHMS

(71) Applicants: Dorianne Marie Friend, Ione, CA (US); Kyle Roof, Ione, CA (US)

(72) Inventors: Dorianne Marie Friend, Ione, CA (US); Kyle Roof, Ione, CA (US)

( * ) Notice: Subject to any disclaimer, the term of this patent is extended or adjusted under 35 U.S.C. 154(b) by 196 days.

(21) Appl. No.: 15/615,505

(22) Filed: Jun. 6, 2017

(51) Int. Cl.
*G06F 17/30* (2006.01)
*G06F 11/36* (2006.01)
*G06F 16/951* (2019.01)
*G06F 16/9535* (2019.01)
G06Q 30/02 (2012.01)
G06F 16/95 (2019.01)

(52) U.S. Cl.
CPC ........ *G06F 11/3664* (2013.01); *G06F 16/951* (2019.01); *G06F 16/9535* (2019.01); *G06F 16/95* (2019.01); G06Q 30/02 (2013.01)

(58) Field of Classification Search
CPC ..... G06F 16/9535; G06F 16/951; G06F 16/95
USPC ........................................................ 707/728
See application file for complete search history.

(56) References Cited

U.S. PATENT DOCUMENTS

| | | | | |
|---|---|---|---|---|
| 7,080,057 B2 * | 7/2006 | Scarborough | ........ | G06Q 10/063 706/60 |
| 9,058,332 B1 * | 6/2015 | Darby | ................. | G06F 16/2228 |
| 2003/0191728 A1 * | 10/2003 | Kulkarni | ................ | G06N 3/086 706/21 |
| 2005/0137939 A1 * | 6/2005 | Calabria | ................ | G06Q 30/02 705/26.1 |
| 2008/0163824 A1 * | 7/2008 | Moser | .................... | G16B 20/00 119/174 |
| 2009/0210371 A1 * | 8/2009 | Laan | .................... | G06K 9/6292 706/21 |
| 2010/0138452 A1 * | 6/2010 | Henkin | ................. | G06Q 30/02 707/803 |
| 2010/0318974 A1 * | 12/2010 | Hrastnik | ............. | G06F 11/3696 717/135 |
| 2011/0004588 A1 * | 1/2011 | Leitersdorf | .......... | G06F 16/951 707/711 |
| 2011/0082712 A1 * | 4/2011 | Eberhardt, III | ........ | G06Q 10/10 705/4 |
| 2011/0213655 A1 * | 9/2011 | Henkin | .................. | G06Q 30/00 705/14.49 |
| 2011/0258049 A1 * | 10/2011 | Ramer | ................... | G06Q 30/02 705/14.66 |
| 2011/0261049 A1 * | 10/2011 | Cardno | .................. | G06Q 10/10 345/419 |
| 2012/0185424 A1 * | 7/2012 | Vaidyanathan | ........ | G06N 7/005 706/52 |
| 2013/0046582 A1 * | 2/2013 | Ramer | ................. | G06Q 10/101 705/7.32 |
| 2013/0198119 A1 * | 8/2013 | Eberhardt, III | ........ | G06N 20/00 706/12 |
| 2013/0212108 A1 * | 8/2013 | Armon-Kest | ......... | G06F 16/215 707/740 |

(Continued)

*Primary Examiner* — Mark E Hershley
(74) *Attorney, Agent, or Firm* — Plager Schack LLP; Mark H. Plager; Stephen Hallberg

(57) ABSTRACT

Methods for testing and rating ranking variables used in search engine algorithms are disclosed. The methods for testing and rating ranking variables used in search engine algorithms create an isolated and contamination-free testing environment in which to test each of one or more individual ranking variables.

10 Claims, 5 Drawing Sheets

(56) References Cited

U.S. PATENT DOCUMENTS

| | | | |
|---|---|---|---|
| 2014/0129553 A1* | 5/2014 | Sankar | G06F 16/9537 |
| | | | 707/724 |
| 2014/0201126 A1* | 7/2014 | Zadeh | G06K 9/627 |
| | | | 706/52 |
| 2014/0201180 A1* | 7/2014 | Fatourechi | G06F 16/2453 |
| | | | 707/706 |
| 2014/0229164 A1* | 8/2014 | Martens | G06F 17/241 |
| | | | 704/9 |
| 2014/0258189 A1* | 9/2014 | Schmidt | G06F 17/246 |
| | | | 706/12 |
| 2015/0161255 A1* | 6/2015 | Battle | G06F 16/9535 |
| | | | 707/706 |
| 2015/0235143 A1* | 8/2015 | Eder | G16H 50/50 |
| | | | 706/12 |
| 2016/0140442 A1* | 5/2016 | Lee | G06N 5/04 |
| | | | 705/2 |
| 2016/0320768 A1* | 11/2016 | Zhao | G05B 19/406 |
| 2017/0004159 A1* | 1/2017 | Voleti | G06F 16/2228 |
| 2017/0068614 A1* | 3/2017 | Jayaraman | G06F 16/285 |
| 2017/0080234 A1* | 3/2017 | Gillespie | A61N 1/36146 |
| 2017/0199943 A1* | 7/2017 | Steelberg | G06F 16/90344 |
| 2018/0341851 A1* | 11/2018 | Chung | G06N 3/04 |

\* cited by examiner

TESTING AND RATING INDIVIDUAL RANKING VARIABLES USED IN SEARCH ENGINE ALGORITHMS

BACKGROUND

Embodiments of the invention described in this specification relate generally to search engine optimization, and more particularly, to a method for testing and rating ranking variables used in search engine algorithms.

Search engine ranking algorithms are complex, involving multiple variables. This complexity makes it almost impossible for search engine optimization ("SEO") professionals to help rank their customers based on fact rather than theory.

Since search engine ranking algorithms typically use multiple variables, the results are in some ways contaminated by conjecture and estimation, rather than verifiable factual conclusions. Thus, the results are often misinterpreted and never lead to single variable understanding of data.

Therefore, what is needed is a way to create and use an isolated testing environment to scientifically and accurately test an individual ranking variable used in a search engine algorithm.

BRIEF DESCRIPTION

Some embodiments of the invention include novel methods for testing and rating ranking variables used in search engine algorithms is disclosed. The methods for testing and rating ranking variables used in search engine algorithms are single ranking variable testing methods that (i) create isolated ranking variable testing environments, (ii) test individual search engine algorithm ranking variables in the isolated ranking variable testing environments, and (iii) rank the individual search engine algorithm ranking variables tested in the isolated ranking variable testing environments.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
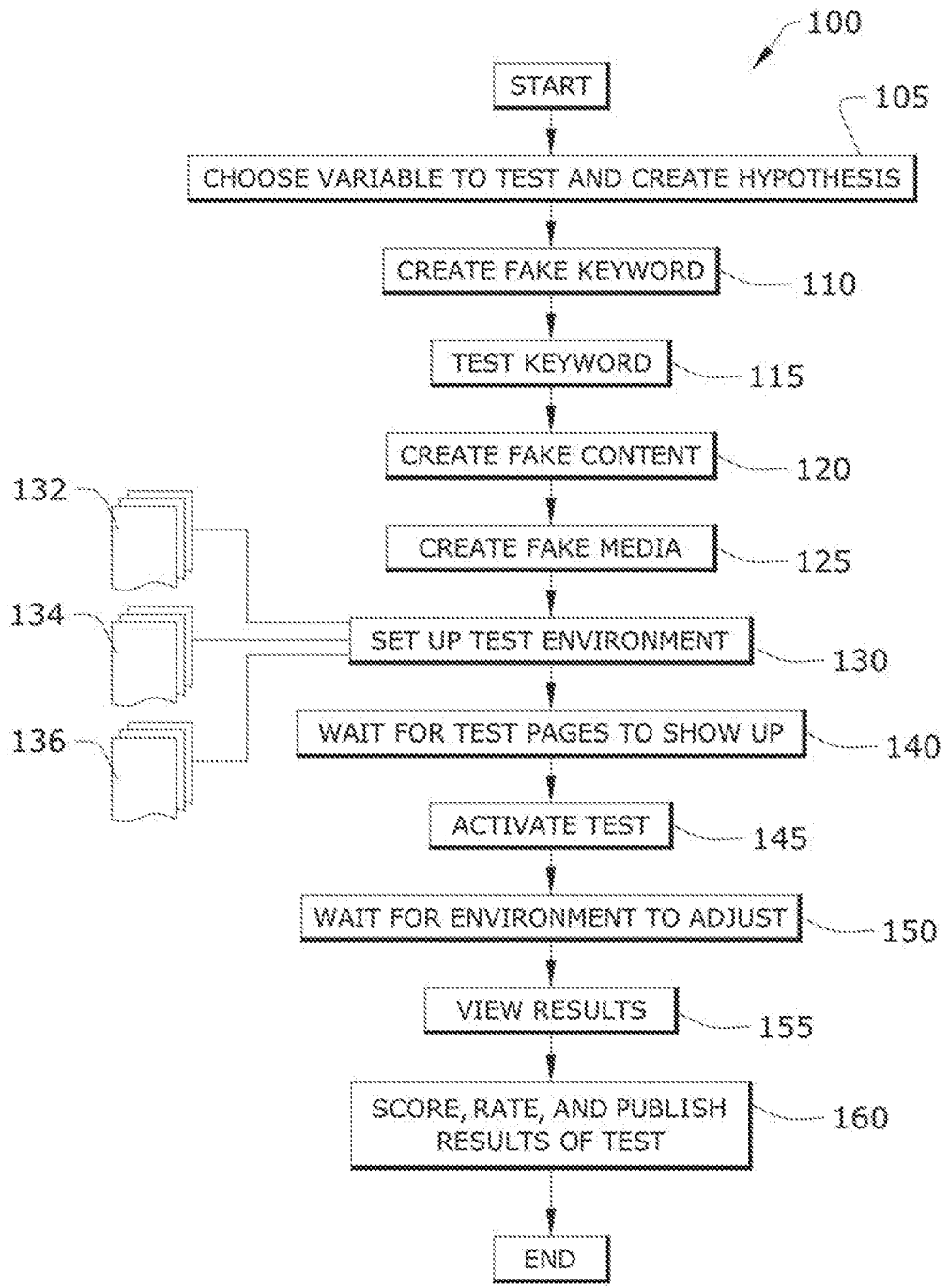
FIG. 1 conceptually illustrates a process for testing a single ranking variable in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include novel methods for testing and rating ranking variables used in search engine algorithms is disclosed. The methods for testing and rating ranking variables used in search engine algorithms are single ranking variable testing methods that (i) create isolated ranking variable testing environments, (ii) test individual search engine algorithm ranking variables in the isolated ranking variable testing environments, and (iii) rank the individual search engine algorithm ranking variables tested in the isolated ranking variable testing environments.

In this specification, there are descriptions of methods and/or processes that are performed by software running on one or more computing devices (e.g., a desktop computer, a server, a laptop, a tablet computing device, a smartphone, a distributed network of computing devices, etc.) test and rate search engine algorithm ranking variables. In some cases, the methods and/or processes are performed by software in conjunction with one or more human actors or as applied to constructs prepared by one or more human actors or external autonomous software modules running on one or more computing devices. However, it should be noted that for the purposes of the embodiments described in this specification, the word "method" is used interchangeably with the word "process". Methods are described, therefore, by reference to example processes that conceptually illustrate process steps for testing and rating search engine algorithm ranking variables.

As stated above, search engine ranking algorithms are complex, involving multiple variables. This makes it almost impossible for SEO professionals to help rank their customers based on verifiable facts as opposed to conjecture, estimation, or theory. Embodiments of the methods for testing and rating ranking variables used in search engine algorithms described in this specification solve such problems by creating a reliable, clean (uncontaminated), and isolated environment to test and score (or rate) each search engine algorithm ranking variable.

Embodiments of the methods for testing and rating ranking variables used in search engine algorithms described in this specification differ from and improve upon currently existing options for testing and rating algorithmic ranking variables. In particular, some embodiments of the methods for testing and rating search engine algorithm ranking variables differ from current industry testing methods, which rely on either multi-variable correlation or case studies to help gain insight into ranking algorithms. In contrast, the methods for testing and rating search engine algorithm ranking variables involve only single variable testing, which is the only way to truly detect if a considered (or tested) variable hinders or helps in ranking.

In addition, some embodiments of the methods for testing and rating search engine algorithm ranking variables improve upon the currently existing options because correlation studies take mass amounts of data from different sources and create a score for each variable. However, the score is based on whether the variable is actually being used, not on whether the variable actually works. For instance, existing options often use case studies, which are done on live site, unit, listing, or resource that have multiple variables in play at any given time for any given live site, unit, listing, or resource. Thus, these types of live case studios cannot resolve which variable is actually making the ranking of a site, unit, listing, or resource, but instead must be content with a suggestion that the several ranking variables in play are making the ranking. In fact, these methods typically lead to misinterpretation of results by the very nature of the results. By contrast, single variable testing, which is performed by the methods for testing and rating search engine algorithm ranking variables described in this specification, allows for scientific and accurate testing of an individual ranking variable by way of the isolated environment created to test each individual ranking variable.

The methods for testing and rating search engine algorithm ranking variables of the present disclosure may be comprised of the following steps and elements. This list of possible constituent steps and elements is intended to be exemplary only and it is not intended that this list be used to limit the methods for testing and rating search engine algorithm ranking variables of the present application to just these steps and elements. Persons having ordinary skill in the art relevant to the present disclosure may understand there to be equivalent steps and elements that may be substituted within the present disclosure without changing the essential function or operation of the methods for testing and rating search engine algorithm ranking variables.

1. Create an unknown word
2. Create unknown paragraphs of text
3. Create unknown media
4. Set up an isolated testing environment
5. Activate and test a single ranking variable in the isolated testing environment set up in the prior step
6. View results of the single ranking variable test
7. Score, rate, and publish the results of the single ranking variable test
8. Continue to test other individual ranking variables, one at a time, in the isolated testing environment when the results of the single ranking variable test are positive
9. View the results of each individual ranking variable test (each individual variable during testing of the other individual ranking variables)
10. Score and rate the results of each individual ranking variable test to determine the ranking weight of each variable
11. Repeat steps 8-10 on all positive results
12. Update findings of tests on dashboard The various steps (steps 1-12 above) and elements (as indicated in steps 1-12 above) of the methods for testing and rating search engine algorithm ranking variables of the present disclosure may be related in the following exemplary fashion. It is not intended to limit the scope or nature of the relationships between the various steps and elements and the following examples are presented as illustrative examples only.

The methods for testing and rating search engine algorithm ranking variables of the present disclosure generally work by performing operations on the elements in steps 1-4 (or adaptions to one or more operations and/or elements in any of these steps) to create the unique single variable isolated testing environment. In this way, an SEO professional (or anyone) can determine whether a given individual single ranking variable helps, harms, or is null with respect to scoring of a site, a unit, a listing, or a resource as determined by the particular ranking algorithm used in the test. However, test set-ups may include a variation of operations in steps 1-4 in combination with order, size, and number of words and/or media being used and algorithmic ranking systems being used. Once a test is objectively shown to have positive or negative results (or null), further tests may be performed in any order to confirm ranking weight. For instance, the test may then move into additional tests to measure, score, and rate the weight of ranking variable.

To make the methods for testing and rating search engine algorithm ranking variables of the present disclosure, one may perform the steps noted above. However, in at least one embodiment of a method for testing and rating a search engine algorithm rank variable, the steps 1-4 can be done in any order. Also, in at least one embodiment of the method for testing and rating the search engine algorithm rank variable, the steps 1-4 can be done in any manner except that it should be an unknown word, unknown content, and/or unknown media which is being tested.

Furthermore, a clean isolated testing environment using unknown/detected elements (e.g., keywords, text, media, etc.) should be created to perform each single ranking variable test. Rating and scoring provide enhancements to core testing (as in continued testing putting single variables against each other), thereby making the method(s) more useful and providing more knowledge on how the ranking algorithm(s) impact or weight the elements.

Furthermore, some embodiments of the methods for testing and rating search engine algorithm ranking variables include only portions of the steps above. For example, in some embodiments, the method for testing and rating search engine algorithm ranking variables includes operations the carry out step 1-7 only, for the testing and rating a single ranking variable and not continuation of testing and rating of other ranking variables.

By way example, FIG. 1 conceptually illustrates a process for testing a single ranking variable 100 in some embodiments. As shown in this figure, the process for testing a single ranking variable 100 starts when it chooses a ranking variable and creates a hypothesis (at 105) of how the ranking variable impacts a site, a unit, a listing, or a resource when tested according to a particular search engine algorithm.

In some embodiments, after the ranking variable is chosen and the hypothesis is created, the process for testing a single ranking variable 100 creates (at 110) a fake keyword. Next, the process for testing a single ranking variable 100 tests (at 115) the fake keyword. In some embodiments, the goal in creating a fake keyword is to find a word that does not exist in a typical resource used in search engine optimization, such as a database, an index, a search engine, or in whatever is being tested. Since the process for testing a single ranking variable 100 is testing an individual ranking variable and monitoring the results of the test, the fake keyword being tested is most predictive when it is unique so that the overall testing and rating is free of contamination. By finding a word that does not exist in the thing being tested, the process for testing a single ranking variable 100 ensures that the testing will be unique for the keyword (unique in the sense that no one else is competing). This lays the ground work for creation of an isolated testing environment that is free from contamination.

In some embodiments, the process for testing a single ranking variable 100 creates (at 120) fake content. For example, the process may create unknown paragraphs of text. In some embodiments, creating unknown paragraphs of content using fake text is done by creating nonsensical words, such as "Lorem Ipsum . . . ", or by generating glyphs from random alphabets (random characters, numbers, and/or symbols). Along with finding and using an unknown word to create a fake key, the creation of unknown paragraphs of fake textual content further isolates the testing environment.

In some embodiments, the process for testing a single ranking variable 100 creates (at 125) fake media. For example, the process may create unknown media, such as blank (empty) images or blank (empty) videos. Creating fake media isolates the testing environment even further. In some embodiments, the step for creating fake media can occur contemporaneously with the step for creating fake textual content and fake paragraphs of test. In some embodiments, the order for creating fake content and fake media can be reversed, such that fake media is created prior to the creation of fake textual content.

In some embodiments, the process for testing a single ranking variable 100 then sets up (at 130) an isolated testing environment. In some embodiments, setting up the isolated testing environment involves setting up a plurality of test environment resources. In this figure, a plurality of test environment resources are associated with setting up the isolated testing environment. Specifically, the plurality of test environment resources includes a first test environment resource 132 with a first title, a second test environment resource 134 with a second title, and a third test environment resource 136 with a third title. The plurality of test environment resources can be web pages, units, listings, areas, or other resources. In some embodiments, the plurality of test environment resources which are set up depends on the search engine algorithm or algorithmic system being tested. In some embodiments, the plurality of test environment resources are set up as identical pages in every way except the title. For instance, the plurality of test environment resources may all have identical number or fake content words and/or media images with identical placement of the fake keyword. This makes the testing environment as clean as possible.

In some embodiments, after the isolated testing environment is set up, the process for testing a single ranking variable 100 then waits (at 140) for test pages to show up. Specifically, the process for testing a single ranking variable 100 of some embodiments waits for control and test pages/areas to show up in the testing environment. In some embodiments, the control and test pages/areas will show up in the search engine that is being tested by way of the process for testing a single ranking variable 100. In some embodiments, the process for testing a single ranking variable 100 starts the actual test after the control pages and test pages/areas appear in the isolated testing environment.

Next, the process for testing a single ranking variable 100 activates (at 145) the test. In some embodiments, the process for testing a single ranking variable 100 activates the test by activating the single ranking variable being tested. In some embodiments, the single ranking variable is activated on the test page by some action that triggers an adjustment of the page. For example, something on the page may be changed or some other thing may be done to the testing environment resource (e.g., the web page, the unit, the listing, the area, or other resource). Next, the process for testing a single ranking variable 100 waits (at 150) for the isolated testing environment to adjust in response to the action.

In some embodiments, after the isolated testing environment has adjusted, the process for testing a single ranking variable 100 presents the results for viewing (at 155). For example, a user may view results of the test which may be visually output by the search engine showing one or three results: that the test page rank increased and the page was visually output at a higher position with respect to control pages than before the test, that the test page rank decreased and the page was visually output at a lower position with respect to control pages than before the test, or that the test page rank stayed the same and the page was visually output at the same position with respect to control pages as before the test.

In some embodiments, the process for testing a single ranking variable 100 then scores, rates, and publishes (at 160) the results of the single ranking variable test. Then the process for testing a single ranking variable 100 ends.

In some embodiments, depending on results the single ranking variable test, further testing ensues. For example, the single ranking variable test can then be moved into further isolated testing environment(s) to determine ranking weight of each single ranking variable by comparing to each other single ranking variable among a plurality of single ranking variables being considered for testing.

Figure 2:
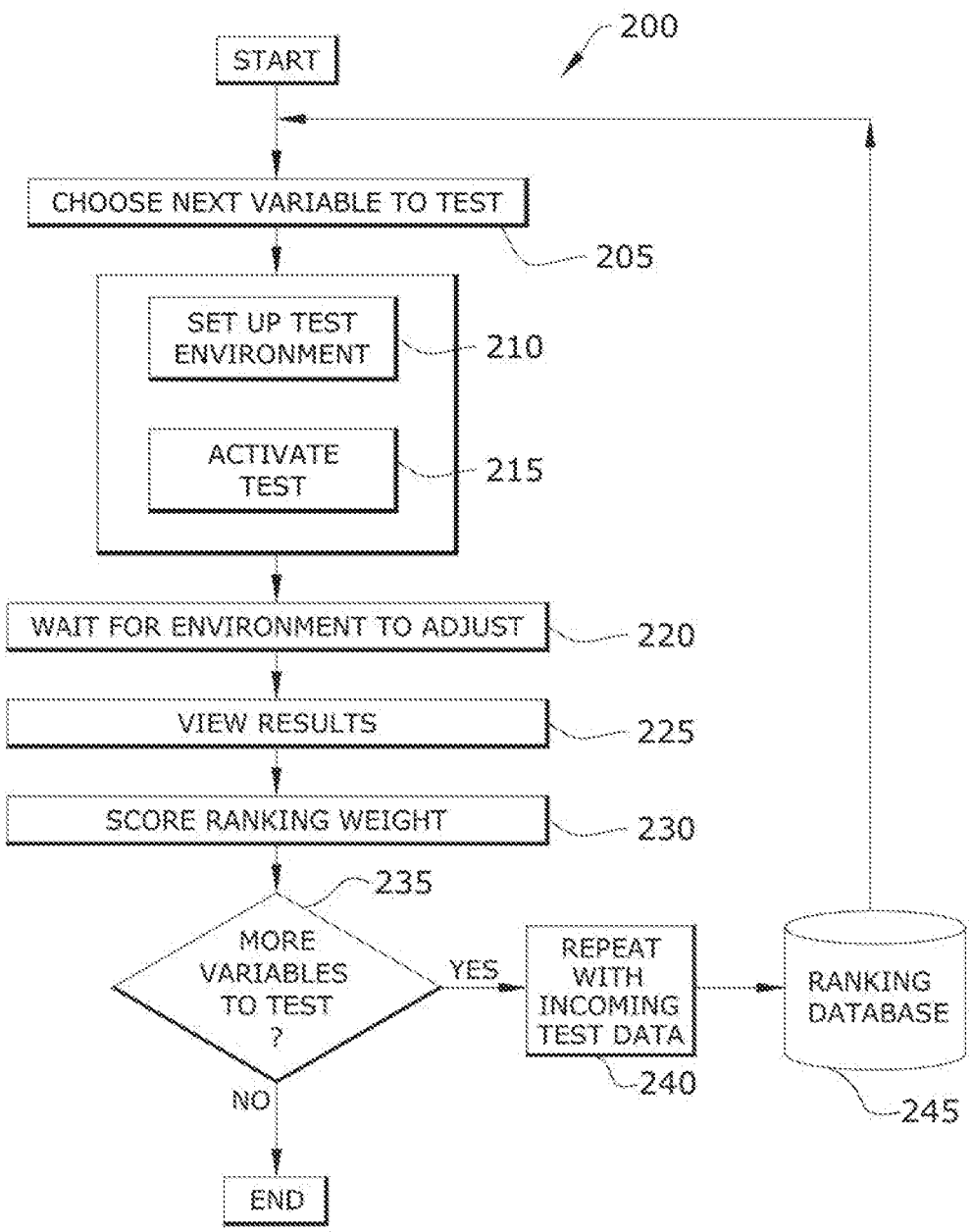
FIG. 2 conceptually illustrates a process for testing each of multiple ranking variables in some embodiments.

By way of example, FIG. 2 conceptually illustrates a process for testing each single ranking variable among a plurality of single ranking variables 200 in some embodiments. As shown in this figure, the process for testing each single ranking variable among a plurality of single ranking variables 200 starts with more than one single ranking variable to test. Furthermore, the process for testing each single ranking variable among a plurality of single ranking variables 200 of some embodiments starts when the test of a single ranking variable produces a positive result. For example, a single ranking variable tested in an isolated testing environment by way of the process for testing a single ranking variable 100, described above by reference to FIG. 1, may result in a higher ranking for the test page than hypothesized. Given such an outcome, additional individual ranking variables may be tested by the process for testing each single ranking variable among a plurality of single ranking variables 200.

In some embodiments, the process for testing each single ranking variable among a plurality of single ranking variables 200 initially chooses (at 205) a next ranking variable to test. In some embodiments, when the next ranking variable to test is chosen, the process for testing each single ranking variable among a plurality of single ranking variables 200 contemporaneously creates a hypothesis for how the next ranking variable impacts a site, a unit, a listing, or a resource when tested according to the particular search engine algorithm that was evaluated during testing of the single ranking variable by the process for testing a single ranking variable 100, described above by reference to FIG. 1.

In some embodiments, the process for testing each single ranking variable among a plurality of single ranking variables 200 uses the same fake keyword, the same fake content, and the same fake media as those created and used during testing of the single ranking variable by way of the process for testing a single ranking variable 100, described above by reference to FIG. 1.

In some embodiments, the process for testing each single ranking variable among a plurality of single ranking variables 200 then sets up (at 210) the isolated testing environment. In some embodiments, the plurality of test environment resources used in the isolated testing environment are the same as those used in connection with the process for testing a single ranking variable 100, described above by reference to FIG. 1. Although not shown in this figure, the plurality of test environment resources (e.g., web pages, units, listings, areas, or other resources) includes the first test environment resource with the first title, the second test environment resource with the second title, and the third test environment resource with the third title, each being identical test environment resources in every way except their respective titles. In this way, the process for testing each single ranking variable among a plurality of single ranking variables 200 makes the isolated testing environment as clean as possible.

In some embodiments, after the control and test pages/areas appear in the search engine of the isolated testing environment, then the process for testing each single ranking variable among a plurality of single ranking variables 200 activates (at 215) the test. Specifically, the process for testing each single ranking variable among a plurality of single ranking variables 200 activates the next ranking variable chosen to be tested. In some embodiments, the next ranking variable is activated on the test page by some action that triggers an adjustment of the page. For example, something on the page may be changed or some other thing may be done to the testing environment resource (e.g., the web page, the unit, the listing, the area, or other resource).

In some embodiments, the process for testing each single ranking variable among a plurality of single ranking variables 200 then waits (at 220) for the isolated testing environment to adjust in response to the action. For example, the search engine updates and visually outputs the test pages in a ranked order. In some embodiments, after the isolated testing environment has adjusted, the process for testing each single ranking variable among a plurality of single ranking variables 200 presents the results for viewing (at 225). Next, the process for testing each single ranking variable among a plurality of single ranking variables 200 scores (at 230) the ranking weight in view of the test results. After scoring the ranking weight, the process for testing each single ranking variable among a plurality of single ranking variables 200 of some embodiments determines (at 235) whether there are more individual (single) ranking variables to be tested in connection with the present ranking variable that was tested.

When there are more single ranking variables remaining in the plurality of single ranking variables to be tested, the process for testing each single ranking variable among a plurality of single ranking variables 200 of some embodiments repeats (at 240) the test with incoming test data. The incoming test data, for instance, may be a following ranking variable to test, such as a single ranking variable in the plurality of ranking variables. Then the process for testing each single ranking variable among a plurality of single ranking variables 200 stores the results into a ranking database 245 before returning to step 205 to choose the next ranking variable to be tested. That is, the next ranking variable in connection with the plurality of ranking variables associated with the single ranking variable tested during the process for testing a single ranking variable 100.

On the other hand, when there are no more single ranking variables to be tested, the process for testing each single ranking variable among a plurality of single ranking variables 200 ends.

In short, by using the processes described by reference to FIGS. 1 and 2, SEO professionals are able to perform tests in relation to single ranking variables, whether there is only one single ranking variable to test (by way of the process for testing a single ranking variable 100 described above by reference to FIG. 1) or multiple single ranking variables to test individually (by way of the process for testing each single ranking variable among a plurality of single ranking variables 200), and to perform such tests in an isolated testing environment that is free from contamination, in order to objectively identify ranking variables that are positive, negative, or neutral in relation to specific search engine algorithms and/or algorithmic systems.

Figure 3:
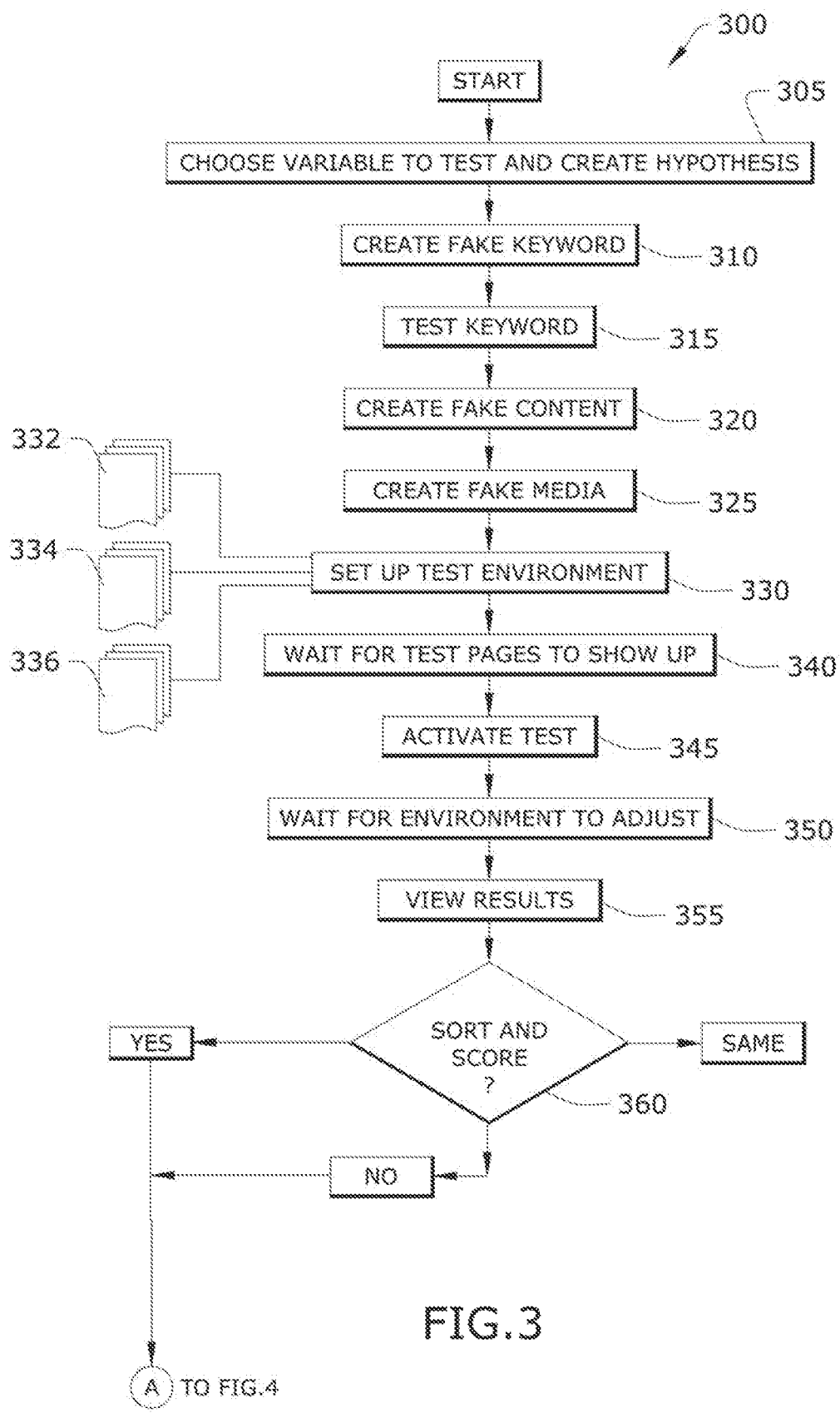
FIG. 3 conceptually illustrates a detailed process for testing and rating search engine algorithm ranking variables in some embodiments.
Figure 4:
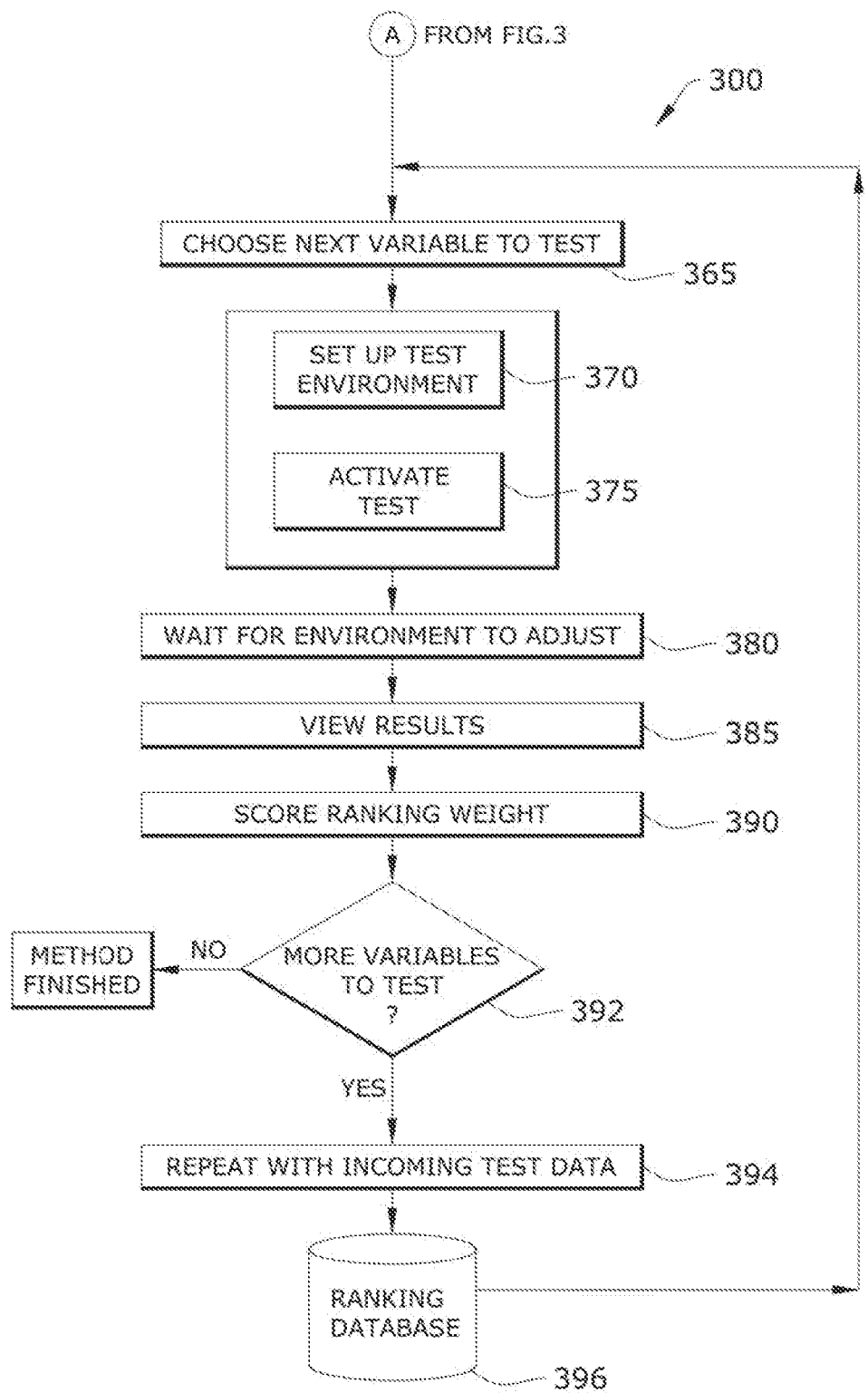
FIG. 4 conceptually illustrates a continuation of the detailed process for testing and rating search engine algorithm ranking variables in some embodiments.

Turning now to another example process, FIGS. 3 and 4 conceptually illustrate a detailed process for testing and rating search engine algorithm ranking variables 300 in some embodiments. The detailed process for testing and rating search engine algorithm ranking variables 300 includes steps from each of the processes described by reference to FIGS. 1 and 2, namely, the process for testing a single ranking variable 100 and the process for testing each single ranking variable among a plurality of single ranking variables 200.

In some embodiments, the detailed process for testing and rating search engine algorithm ranking variables 300 starts by choosing a single ranking variable and creating a hypothesis (at 305) of how the single ranking variable impacts a site, a unit, a listing, or a resource when tested according to a particular search engine algorithm.

Next, the detailed process for testing and rating search engine algorithm ranking variables 300 creates (at 310) and tests (315) a fake keyword. In some embodiments, the detailed process for testing and rating search engine algorithm ranking variables 300 then creates (at 320) fake content and creates (at 325) fake media.

In some embodiments, the detailed process for testing and rating search engine algorithm ranking variables 300 sets up (at 330) an isolated testing environment along with a plurality of test environment resources, such as a first resource 332, a second resource 334, and a third resource 336, all with distinct titles, but identical in every other way.

In some embodiments, the detailed process for testing and rating search engine algorithm ranking variables 300 waits (at 340) for test pages and control pages to show up. When the test pages and control pages appear, the detailed process for testing and rating search engine algorithm ranking variables 300 activates (at 345) the test against the chosen single ranking variable. Next, the detailed process for testing and rating search engine algorithm ranking variables 300 waits (at 350) for the isolated testing environment to adjust in response to the activated test.

In some embodiments, after the isolated testing environment has adjusted, the detailed process for testing and rating search engine algorithm ranking variables 300 presents the results for viewing (at 355). Based on the results, the detailed process for testing and rating search engine algorithm ranking variables 300 then determines (at 360) whether to sort and score. When the results of the test are the same as expected in the initial hypothesis (e.g., no change in rank of test page for the chosen single ranking variable), the detailed process for testing and rating search engine algorithm ranking variables 300 may publish the results as being the same as hypothesize and then ends. On the other hand, when the results of the test are either positive or negative, the detailed process for testing and rating search engine algorithm ranking variables 300 of some embodiments publishes the results as being better than hypothesized (i.e., positive results were observed) or worse than hypothesized (i.e., negative results occurred) and then continues on testing other single ranking variables.

As shown in FIG. 4, the detailed process for testing and rating search engine algorithm ranking variables 300 of some embodiments chooses (at 365) the next single ranking variable to test. Along with choosing the next single ranking variable, the detailed process for testing and rating search engine algorithm ranking variables 300 of some embodiments also creates a hypothesis regarding the impact of the next single ranking variable in terms of the search engine algorithm being used in the isolated testing environment.

Again, after the next single ranking variable is chosen (and the hypothesis is created) the detailed process for testing and rating search engine algorithm ranking variables 300 sets up (at 370) the isolated testing environment and then activates (at 375) the test.

In some embodiments, the detailed process for testing and rating search engine algorithm ranking variables 300 then waits (at 380) for the isolated testing environment to adjust in response to the test activation. After the isolated testing environment has adjusted, the detailed process for testing and rating search engine algorithm ranking variables 300 presents the results for viewing (at 385). Following the presenting and viewing of the results, the detailed process for testing and rating search engine algorithm ranking variables 300 scores (at 390) the ranking weight in view of the test results.

In some embodiments, the detailed process for testing and rating search engine algorithm ranking variables 300 then determines (at 392) whether there are more individual (single) ranking variables to be tested. When there are more single ranking variables remaining in the plurality of single ranking variables to be tested, the detailed process for testing and rating search engine algorithm ranking variables 300 repeats (at 394) the test with incoming test data and stores the results into a ranking database 396 before returning to step 365 to choose the next single ranking variable to be tested. On the other hand, when there are no more single ranking variables to be tested, the detailed process for testing and rating search engine algorithm ranking variables 300 ends.

While the examples described above pertain to search engine optimization and helping SEO professionals (and others) to identify accurate single ranking variable impacts, weights, and rankings, the methods and processes described in this specification can be adapted for use in any field that requires a clean isolated environment to determine a single variable measurement and weight in ranking/rating algorithms and/or environments.

Furthermore, the methods and process described herein and the results from those methods and processes can produce knowledge to be used in helping customers rank better, helping other SEO professionals help their customers rank, publishing results worldwide to separate what is myth from what is fact in ranking environments (e.g., published white papers, publications, web blogs, SEO-related news feeds, etc.), creating software that predicts what a web page, listing, area, resource, etc., needs in order to perform better in ranking environment, creating software plugins that resolve items that help in ranking environment, creating software solutions based on findings, and creating one or more documented scale(s) of findings.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 5:
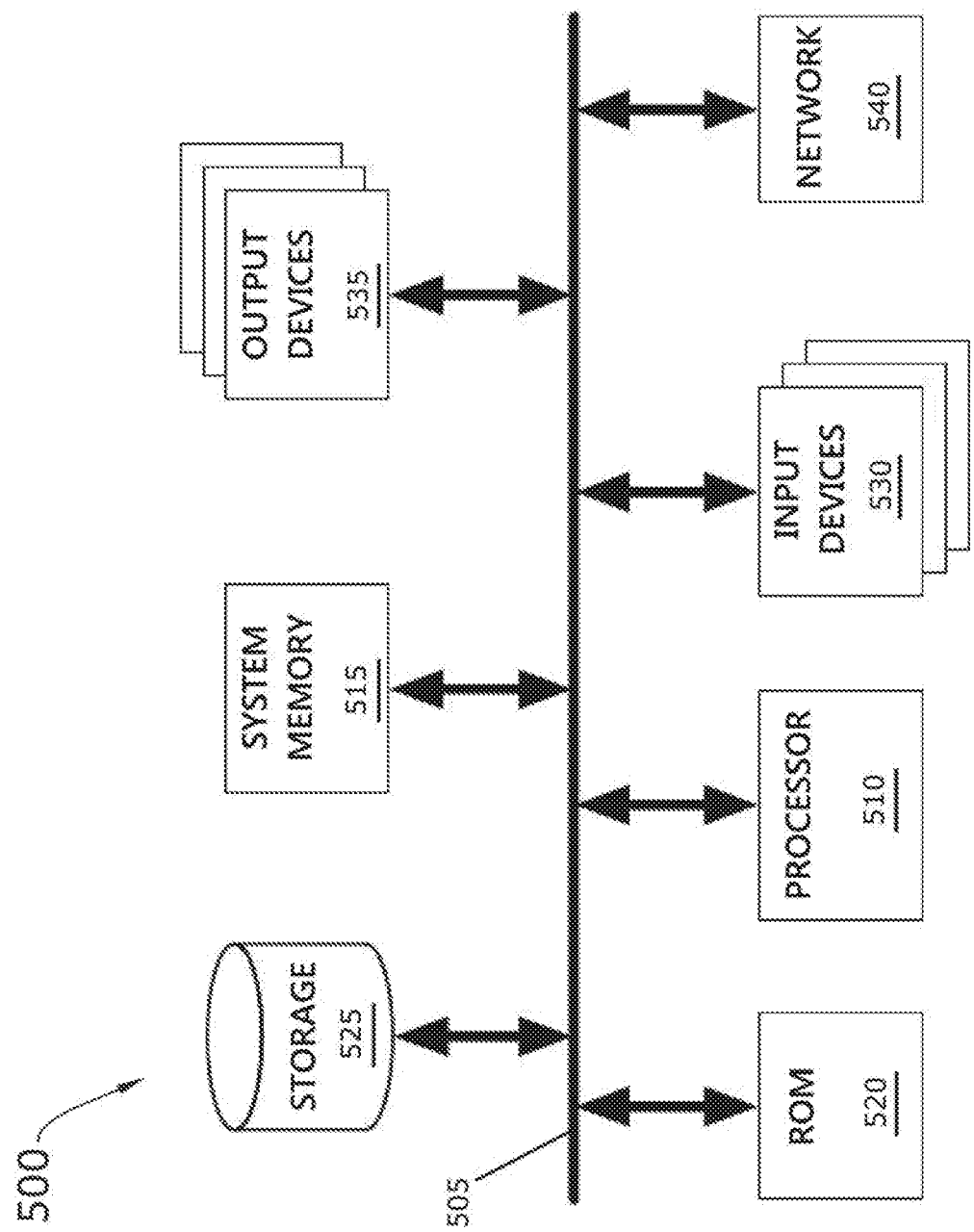
FIG. 5 conceptually illustrates an electronic system with which some embodiments of the invention are implemented.

FIG. 5 conceptually illustrates an electronic system 500 with which some embodiments of the invention are implemented. The electronic system 500 may be a computer, phone (cell phone, mobile phone, smartphone, etc.), a personal digital assistant (PDA) device or personal media device (iPod, other handheld computing device, etc.), a tablet computing device, or any other sort of electronic device or computing device. Such an electronic system includes various types of computer readable media and interfaces for various other types of computer readable media. Electronic system 500 includes a bus 505, processing unit(s) 510, a system memory 515, a read-only 520, a permanent storage device 525, input devices 530, output devices 535, and a network 540.

The bus 505 collectively represents all system, peripheral, and chipset buses that communicatively connect the numerous internal devices of the electronic system 500. For instance, the bus 505 communicatively connects the processing unit(s) 510 with the read-only 520, the system memory 515, and the permanent storage device 525.

From these various memory units, the processing unit(s) 510 retrieves instructions to execute and data to process in order to execute the processes of the invention. The processing unit(s) may be a single processor or a multi-core processor in different embodiments.

The read-only-memory (ROM) 520 stores static data and instructions that are needed by the processing unit(s) 510 and other modules of the electronic system. The permanent storage device 525, on the other hand, is a read-and-write memory device. This device is a non-volatile memory unit that stores instructions and data even when the electronic system 500 is off. Some embodiments of the invention use a mass-storage device (such as a magnetic or optical disk and its corresponding disk drive) as the permanent storage device 525.

Other embodiments use a removable storage device (such as a floppy disk or a flash drive) as the permanent storage device 525. Like the permanent storage device 525, the system memory 515 is a read-and-write memory device. However, unlike storage device 525, the system memory 515 is a volatile read-and-write memory, such as a random access memory. The system memory 515 stores some of the instructions and data that the processor needs at runtime. In some embodiments, the invention's processes are stored in the system memory 515, the permanent storage device 525, and/or the read-only 520. For example, the various memory units include instructions for processing appearance alterations of displayable characters in accordance with some embodiments. From these various memory units, the processing unit(s) 510 retrieves instructions to execute and data to process in order to execute the processes of some embodiments.

The bus 505 also connects to the input and output devices 530 and 535. The input devices enable the user to communicate information and select commands to the electronic system. The input devices 530 include alphanumeric keyboards and pointing devices (also called "cursor control devices"). The output devices 535 display images generated by the electronic system 500. The output devices 535 include printers and display devices, such as cathode ray tubes (CRT) or liquid crystal displays (LCD). Some embodiments include devices such as a touchscreen that functions as both input and output devices.

Finally, as shown in FIG. 5, bus 505 also couples electronic system 500 to a network 540 through a network adapter (not shown). In this manner, the computer can be a part of a network of computers (such as a local area network ("LAN"), a wide area network ("WAN"), or an intranet), or a network of networks (such as the Internet). Any or all components of electronic system 500 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 1-4 conceptually illustrate processes in which the specific operations of each process may not be performed in the exact order shown and described. Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

We claim:

1. A process for testing a single ranking variable in connection with a search engine algorithm, said process comprising:

choosing a single ranking variable to test a plurality of test environment resources comprising (i) a first test environment resource with a first title, (ii) a second test environment resource with a second title, and (iii) a third test environment resource with a third title, wherein each of the first test environment resource, the second test environment resource, and the third test environment resource comprises at least one of a plurality of web pages, a plurality of units, a plurality of listings, and a plurality of areas, wherein the single ranking variable is chosen to test the plurality of test environment resources in an isolated testing environment;

creating a fake and unique keyword to test for uniqueness in a resource used in search optimization, wherein the resource comprises one of a database used in search optimization, an index used in search optimization, and a search engine used in search optimization, wherein the fake and unique keyword is a keyword that does not exist in a typical resource used in search engine optimization;

testing the fake and unique keyword for existence in the resource, wherein the fake and unique keyword is unknown with respect to the resource when the fake and unique keyword does not exist in the resource;

creating fake content comprising paragraphs of fake textual textual content, wherein the fake textual content comprises at least one of nonsensical words and glyphs from random alphabets;

creating fake media comprising at least one of blank images and blank videos;

setting up the first test environment resource with a first title, the second test environment resource with a second title, and the third test environment resource with a third title, wherein each of the first test environment resource, the second test environment resource, and the third test environment resource are set up with identical placement of the fake and unique keyword;

setting up the isolated testing environment with the plurality of test environment resources to ensure a clean isolated testing environment that includes the fake and unique keyword to free the isolated testing environment from contamination of an improper keyword which exists within the plurality of test environment resources, wherein the isolated testing environment comprises a plurality of test pages and control pages on which to test the single ranking variable;

activating a test in the isolated testing environment by performing an action that triggers an adjustment of the plurality of test pages and control pages to activate the single ranking variable, wherein test results of the single ranking variable are based on a response of the isolated testing environment to the action that triggers the adjustment of the plurality of test pages and control pages;

determining impact of the single ranking variable based on the test results, said test results comprising only one of a first test result in which page rank of the plurality of test pages and control pages increased and the plurality of test pages and control pages are output at higher positions with respect to the plurality of test environment resources than before activating the test, a second test result in which the page rank of the plurality of test pages and control pages decreased and the plurality of test pages and control pages are output at a lower position with respect to the plurality of test environment resources than before the activating the test, and a third test result in which the page rank maintained a same rank and the plurality of test pages and control pages are output at a same position with respect to the plurality of test environment resources as before activation of the test;

visually outputting the test results of the test for a user to view; and scoring, rating, and publishing results of the test.

2. The process of claim 1, wherein each page in the plurality of test pages and control pages includes a set of page content and a page title.

3. The process of claim 2, wherein the set of page content includes the fake and unique keyword, the fake content, and the fake media.

4. The process of claim 2, wherein the set of page content is identical for all pages in the plurality of test pages and control pages.

5. The process of claim 4, wherein the page title is different for each page in the plurality of test pages and control pages.

6. A process for testing and rating search engine algorithm ranking variables, said process comprising:

choosing a single ranking variable to test a plurality of test environment resources comprising (i) a first test environment resource with a first title, (ii) a second test environment resource with a second title, and (iii) a third test environment resource with a third title, wherein each of the first test environment resource, the second test environment resource, and the third test environment resource comprises at least one of a plurality of web pages, a plurality of units, a plurality of listings, and a plurality of areas, wherein the single ranking variable is chosen to test the plurality of test environment resources in an isolated testing environment;

creating a hypothesis of how the single ranking variable impacts one of a site, a unit, a listing, and a resource when tested according to a particular search engine algorithm;

creating a fake keyword to test for uniqueness in a resource used in search optimization, wherein the resource comprises one of a database used in search optimization, an index used in search optimization, and a search engine used in search optimization, wherein the fake keyword is a keyword that does not exist in a typical resource used in search optimization;

testing the fake keyword for existence in the resource, wherein the fake keyword is unique with respect to the resource when the fake keyword does not exist in the resource;

creating fake content comprising paragraphs of fake textual textual content, wherein the fake textual content comprises at least one of nonsensical words and glyphs from random alphabets;

creating fake media comprising at least one of blank images and blank videos;

setting up the first test environment resource with a first title, the second test environment resource with a second title, and the third test environment resource with a third title, wherein each of the first test environment resource, the second test environment resource, and the third test environment resource are set up with identical placement of the fake keyword, identical fake content, identical fake media, and distinct titles for the first title, the second title, and the third title;

setting up the isolated testing environment with the plurality of test environment resources to ensure a clean isolated testing environment that includes the fake keyword to free the isolated testing environment from contamination of an improper keyword which exists within the plurality of test environment resources, wherein the isolated testing environment comprises a plurality of test pages and control pages on which to test the single ranking variable;

delivering a control and test page in the isolated testing environment, wherein after appearing in the isolated testing environment the single ranking variable can be activated on the control and test page to activate a test in the isolated testing environment;

performing an action that triggers an adjustment of the control and test page to activate the single ranking variable, wherein the single ranking variable is tested in relation to the isolated testing environment response to the action that triggers the adjustment of the control and test page;

determining test results in view of the hypothesis of the single ranking variable impact, said test results comprising only one of a first test result in which a page rank of the control and test page increased and the control and test page is output at a higher position with respect to the plurality of test environment resources than before the test, a second test result in which the page rank of the control and test page decreased and the control and test page is output at a lower position with respect to the plurality of test environment resources than before the test, and a third test result in which the page rank maintained a same rank and the control and test page is output at a same position with respect to the plurality of test environment resources as before the test;

visually outputting the test results of the test for a user to view;

scoring, rating, and publishing the test results of the single ranking variable contemporaneously with visually outputting the test results of testing the single ranking variable;

determining whether to move the single ranking variable into another isolated testing environment to determine ranking weight of the single ranking variable in comparison to a plurality of other single ranking variables, wherein the single ranking variable is moved into another isolated testing environment when one of (i) the published test results are better than expected in view of the hypothesis of the single ranking variable impact and (ii) the published test results are worse than expected in view of the hypothesis of the single ranking variable impact;

testing a next single ranking variable in a second isolated testing environment when the published test results for the single ranking variable are one of better than expected and worse than expected, wherein testing the next single ranking variable comprises performing a second action that triggers a second adjustment in the second isolated testing environment;

visually outputting the next single ranking variable test results for the user to view;

scoring, ranking, and weighting the next single ranking variable test results contemporaneously with visually outputting the next single ranking variable test results;

determining whether to test other single ranking variables; and repeating the testing of other single ranking variables when results of testing are inconsistent with hypothesized results of testing the other single ranking variables.

7. The process for testing and rating search engine algorithm ranking variables of claim 6, wherein the user views the test results to compare with the hypothesis.

8. The process for testing and rating search engine algorithm ranking variables of claim 6, wherein the single ranking variable is tested in the isolated testing environment in connection with a search engine algorithm.

9. The process for testing and rating search engine algorithm ranking variables of claim 6, wherein the isolated testing environment includes a plurality of pages that are free from contamination.

10. The process for testing and rating search engine algorithm ranking variables of claim 6, wherein the single ranking variable is a first single ranking variable and the next single ranking variable is a second different single ranking variable, wherein the process further comprises testing a third single ranking variable that is different from the first single ranking variable and the second singled ranking variable.

* * * * *